United States Patent Office 2,980,498
Patented Apr. 18, 1961

2,980,498
RECOVERY OF LITHIUM FROM LITHIUM BEARING ORES

Robert M. Wheaton and Raymond J. Anderson, Midland, Mich., assignors to The Dow Chemical Company, Midland, Mich., a corporation of Delaware No Drawing. Filed Jan. 29, 1957, Ser. No. 636,870

7 Claims. (Cl. 23—32)

This invention relates to a process for the recovery of lithium from lithium bearing ores, and more particularly, to a process for the recovery of lithium from ores which contain lithium in an acid soluble form by contacting the ore with a cation exchange resin.

The production of lithium is mainly limited to the recovery of the metal from spodumene, lepidolite, and other natural deposits. The lithium content in these deposits is relatively small and chemically combined so that expensive processing is necessary to recover the metal. The ore is generally ground, heated to high temperatures with an acid or other reactants to convert the lithium to a soluble salt or base, and then leached. Lithium-bearing ores contain aluminum, potassium, and other constituents which also react with the reactant added to convert the lithium. Many of these constituents form soluble salts which are leached from the ore with the lithium salt. Thus, it requires the use of a large amount of acid or other reactant to convert the relatively small amount of lithium to a leachable salt and, furthermore, a difficult separation of the lithium from the other soluble constituents in the leach solution must be made. The process by which the lithium could be recovered from the lithium bearing ore in a relatively pure solution and without the use of acids or other reactants would greatly decrease the cost of and simplify the recovery of lithium.

It is, therefore, a principal object of this invention to provide an economical and simplified process for the recovery of lithium from lithium bearing ores. A further object is to provide a process where the lithium may be recovered in a solution which does not contain a high percentage of aluminum and other soluble salts. Another object is to provide a process which does not require calcining the ore with acid or other salts and thus eliminates the use of expensive equipment.

It has been discovered that the lithium from ores or concentrates containing lithium in an acid soluble form may be recovered by contacting the ore, in the presence of water, with a strongly acidic cation exchange resin in the acid form to obtain an ion exchange of the lithium from the ores to the ion exchange resin, separating the resin from the contacted ore, and recovering the lithium from the resin.

In the process, the lithium bearing ores are ground and mixed with a strongly acidic cation exchange resin and water. When the ore is contacted with the resin, the lithium ions from the ore will replace the hydrogen ions on the resin. Mixing during this period is preferred so that a good contact between the resin and the ore is obtained. After the ion exchange has taken place, the resin is separated from the ore by known methods such as vigorous back washing or screening. The ore is generally ground to a smaller particle size than the resin which aids in the separation. The separated resin is then eluted with an electrolyte, such as hydrochloric acid, nitric acid, or sodium and potassium salts depending upon the lithium salt desired. If other than a strong acid is used, the resin must be regenerated to the acid form before it can be reused. If it is preferred to obtain the lithium as lithium hydroxide, the resin may be eluted with a hydroxide, such as sodium hydroxide and potassium hydroxide, but then in order to have the resin in condition for contacting with more lithium bearing ore, the resin must be contacted wth an acid to convert the resin to the acid form.

The lithium bearing ores which may be used for the recovery of lithium by this process are the type which have the lithium in an acid soluble form such as lepidolite, beta-spodumene and amblygonite. Many of the lithium bearing ores may not have the lithium in a soluble form in the natural state, but may be converted to the desirable form by heating the ore to a high temperature. For example, spodumene in its natural state is in the alpha form which has the lithium bound in an acid insoluble form. Upon heating the spodumene to a temperature of around 1000° C. it will be converted to beta-spodumene in which the lithium is acid leachable.

The resins which may be used in the process are the strongly acid cation exchange resins, for example, the sulfonic type cation exchange resins as described in U.S. Patent Numbers 2,597,438, 2,500,149, and 2,366,007.

The ratio of ore to resin which is used is not critical. Very little increase in the recovery of the lithium from the ore is obtained by increasing the ratio of resin to ore above a chemcal equivalent of 1:1. The rate and percent recovery of the lithium is affected by the particle size of the ore or concentrate and will increase with the smaller particle size material.

The contact time of the resin with the ore is likewise not critical. The major portion of the lithium is transferred from the ore to the on exchange resin in about 24 hours. Further increasing the contact time above the 24 hours will increase the amount of lithium transferred but at a slow rate.

It is apparent to a person skilled in the art that the process of the invention may be practiced in batch or in a continuous manner to obtain the advantages of a continuous process. In continuous operations, a counter current contact may be obtained by using a moving bed of resin. Since the particles of the resin may be larger than the particles of the ore, the resin may be placed in a series of moving screen beds which will retain the resin but allow the ore to pass through.

The following examples further illustrate the invention but are not to be construed as limiting the invention thereto.

Example I

To a flask, 10 grams of finely divided beta-spodumene containing 41 milliequivalents of lithium, 10 milliliters of a strongly acid sulfonic type cation exchange resin, such as descrbed in U.S. Patent Number 2,366,077 and similar to the product sold by The Dow Chemical Company under the trademark "Dowex 50," and 50 milliliters of water were added. The ion exchange resin was in the acid form and the chemical equivalent ratio of ore to resin was approximately 1:1. The flask was placed on a shaker and the contents were agitated for 4 days at room temperature. After this time the coarse resin was separated from the ore slurry by screening. The resin was then placed in a column and eluted with 50 milliliters of 3 N hydrochloric acid. The effluent from the resin column had a density of 1.052 grams per milliliter and contained 0.12 weight percent lithium. The effluent contained 9.5 milliequivalents of lithium which represented a 23.1 percent recovery of the lithium from the ore and a 52 percent conversion of the resin to the lithium form.

A second run was made in the manner described above except that the ratio of the resin to the ore was changed. To the flask, 5 grams of beta-spodumene, 11.7 ml. of the cation exchange resin, and 50 ml. of water were added. The flask was agitated for 5 days at room temperature. The resin was eluted with 50 ml. of a 3 N hydrochloric acid. The effluent contained 5.2 milliequivalents of lithium which represented a 25.3 percent recovery of the lithium from the ore and a 25 percent conversion of the resin to lithium.

*Example II*

Two runs were made to show the effect of particle size of the ore upon the rate and percent recovery of the lithium. The particle size analyses of the ore used are given below.

| Run 1 | | Run 2 | |
| --- | --- | --- | --- |
| Average Particle Diameter, Micron | Percent of Total Weight | Average Particle Diameter, Micron | Percent of Total Weight |
| 13 | 0.8 | 1.3 | 8.3 |
| 38 | 4.3 | 3.8 | 31.3 |
| 75 | 9.5 | 6.3 | 32.4 |
| 125 | 16.2 | 8.8 | 6.1 |
| 175 | 7.4 | 11.3 | 16.1 |
| 225 | 10.5 | 13.8 | 5.8 |
| 360 | 21.6 | | |
| 400 | 29.6 | | |

To a flask, 5 grams of the beta-spodumene, 11.1 milliliters of cation exchange resin as described in Example I, and 100 milliliters of water were added. The ion exchange resin was in the acid form and the chemical equivalent ratio of ore to resin was approximately 1:1. The flask was placed on a shaker and agitated for 5½ days. After this time the resin was separated from the ore by use of a 60 mesh screen and placed in a ⅝ inch I.D. column where it was contacted with 50 milliliters of 3 N hydrochloric acid and rinsed with water.

The effluent from the resin was analyzed for lithium and found that in run 1 with the coarse ore about 3.9 percent of the lithium in the ore was recovered, while for run 2, 15.7 percent was recovered.

It will be apparent from the detailed discussion and the example that the lithium can be easily recovered from the lithium bearing ores by use of a cation exchange resin. The advantages of this process are that the recovery of lithium is made without the use of expensive equipment which is required for calcining the ore with acid or other reactants. Also the lithium solution product obtained is relatively free of other constituents of the ore, especially aluminum which is difficult to separate from the lithium.

What is claimed is:

1. A process for the recovery of lithium values from a solid lithium bearing ore containing lithium in an acid leachable form, which comprises contacting the solid ore, in the presence of water, with a solid, strongly acidic cation exchange resin in the acid form to obtain an ion exchange of the lithium from the ore to the ion exchange resin, separating the resin from the contacted ore, and recovering the lithium values from the resin.

2. A process according to claim 1 wherein the lithium bearing ore is beta-spodumene.

3. A process according to claim 1 wherein the lithium bearing ore is lepidolite.

4. A process for the recovery of lithium values from a solid lithium bearing ore containing lithium in an acid leachable form, which comprises contacting the ore with a solid, strongly acid cation exchange resin in the acid form for a length of time in the range of 1 to 5 days to obtain an ion exchange of the lithium from the ore to the ion exchange resin, separating the resin from the contacted ore, and recovering the lithium values from the resin.

5. A process according to claim 4 wherein the lithium bearing ore is beta-spodumene.

6. A process according to claim 4 wherein the lithium bearing ore is lepidolite.

7. A process according to claim 4 wherein the ore is contacted with the strongly acid cation exchange resin for a length of time of 1 day.

References Cited in the file of this patent

UNITED STATES PATENTS

| 2,516,109 | Ellestad et al. | July 25, 1950 |
| 2,648,601 | Byler et al. | Aug. 11, 1953 |

OTHER REFERENCES

Kunin: "Industrial and Engineering Chemistry," vol. 42, No. 1, pages 65 to 70 (1950); vol. 45, No. 1, pages 83–88, January 1953.

Nachod et al.: "Ion Exchange Technology," Academic Press Inc., publishers, New York, 1956, page 294.

Kressman et al. in "Chemical Society Journal," 1949, part 2, pages 1190–1201.